Patented Aug. 28, 1945

2,383,561

UNITED STATES PATENT OFFICE 2,383,561

PROCESS FOR ISOLATING CHEMICAL COMPOUNDS FROM MATERIALS OF NATURE

Harold G. Petering, Metuchen, N. J., and Paul W. Morgal, East Lansing, Mich., assignors to The Michigan State Board of Agriculture No Drawing. Application March 14, 1941, Serial No. 383,450

11 Claims. (Cl. 260—666)

The invention relates to the recovery from agricultural products or other sources in nature certain unsaponifiable constituents which are in some instances useful for foods or medicines, and in other cases are useful as intermediates for the preparation of other products of value. More particularly the invention relates to the recovery of carotene, sterols, and other unsaponifiable constituents from dehydrated green plant tissue.

One of the objects of the invention is to provide a simple and economical process for obtaining carotene-containing products useful as foods for humans and for animals because of their provitamin A activity.

Another object of the invention is to obtain from green plant material a product which may be irradiated to develop vitamin D activity.

Another object of the invention is to provide a simple procedure for separating carotene from chlorophyl in extracts containing the same.

A further object is to provide a process by which green plant material is converted into a large variety of different products of commercial value.

In connection with any attempt to use green plant tissue for commercial purposes it is highly desirable to remove carotene, chlorophyl, xanthophyll, sterols, and other lipoidal materials which are easily extracted by suitable organic solvents both to prepare the tissue for further processing and to conserve these valuable products. Some of the extracted materials interfere with further use of the tissue if they are not removed. By means of this invention the extraction is carried out in such a way that the fiber, proteins, and carbohydrates are not substantially changed in the process, and so the extracted tissue is useful for feed purposes insofar as these constituents are useful.

Carotene, especially beta-carotene, is found widely distributed in green plants. This fact may be utilized to supply man with an extensive renewable source of provitamin A. However, the mere fact that there is an abundance of carotene in nature does not mean that it is readily available to man. It is known that carotene in fresh tissue decomposes rapidly after the plant has been cut. It is also known that the carotene content of plants varies with their stage of growth. This means that the carotene should be preserved in some way in the tissue and that the plants should be cut at the right time if the maximum carotene is to be conserved. Dehydration of plant tissue (rapid commercial dehydration) greatly extends the period of time during which carotene can be preserved in the tissue, but even in the case of dehydrated tissue carotene eventually decomposes. This decomposition of carotene in dehydrated tissue is influenced by storage conditions.

The present invention when utilized in the treatment of dehydrated green tissue results in obtaining carotene concentrates which are less susceptible to decomposition since they contain in addition to sterols and unsaponifiable constituents a natural stabilizer which protects the carotene from oxidation in the air.

In order to better illustrate the invention, the following diagram is shown:

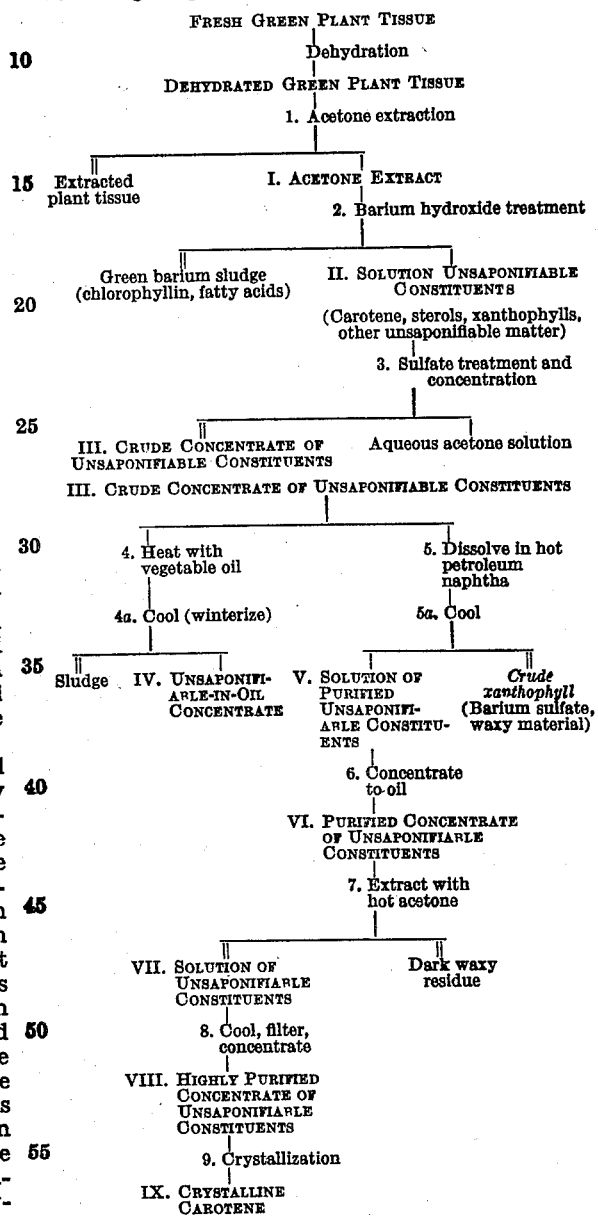

Referring now to the preceding diagram, the invention may be carried out as follows.

The dehydrated green plant tissue is first extracted with a suitable organic solvent which is miscible with water, preferably acetone. The extraction may be carried out with cold solvent or under reflux with hot solvent and with any type of equipment which is suitable and desirable. The efficiency of the extraction is favorably influenced by agitation, by the use of the principle of countercurrent extraction, and by the fineness of the tissue used, although there is an optimum fineness of the tissue depending on the extraction apparatus and the subsequent use of the tissue. Care should be taken to keep the water content of the solvent very low for the initial extraction indicated in step 1.

The green pigment solution (I) is then concentrated to as small an amount as will be compatible with conditions for the barium hydroxide treatment. To the concentrated pigment solution is added a water solution of barium hydroxide octahydrate which has been saturated with the barium hydroxide octahydrate at about 60° C. For optimum activity of the barium hydroxide treatment it is necessary to keep the water: acetone ratio in the final mixture at 15:85, and this is the condition which governs the volume of the barium hydroxide octahydrate which is used, its concentration and therefore the temperature at which saturation is obtained.

The fineness of the solid is kept uniform and reproducible and at its optimum if the solid reagent is prepared by adding a barium hydroxide solution to the concentrated acetone extract in such a way that the acetone/water ratio is maintained at its optimum; or by adding to the acetone extract the required amount of solid reagent formed by mixing a solution of barium hydroxide and an equal volume of acetone, and subsequently adding water to the mixture of acetone extract and solid reagent in sufficient amount to bring the acetone/water ratio to its optimum. There are other methods for preparing the reaction mixture and these include adding finely ground crystalline barium hydroxide octahydrate; by hydrating anhydrous barium hydroxide in the presence of acetone or a portion of the acetone extract mixing this proportion and the extract and diluting to the optimum acetone/water ratio; and adding the anhydrous barium hydroxide directly to the aqueous acetone extract so that in the resulting mixture barium hydroxide octahydrate is formed and the water/acetone ratio is at its optimum.

One very important condition for good reaction on a large scale is the addition of a certain amount of filter aid to the reaction mixture simultaneous with the addition of the barium hydroxide solution or subsequent to it. This is important for it keeps the barium sludge granular and prevents caking. This makes subsequent filtration and washing of the cake very simple. The mixture is then refluxed for a suitable length of time to complete the reaction. This time varies from 15 minutes to 45 minutes depending on the conditions of reflux.

The barium sludge may be regenerated by suitable methods, or it can be treated to yield water-soluble derivatives of chlorophyl. In the latter case the barium sludge is heated with a strong solution of sodium carbonate, and then filtered. The precipitate contains some sludge and barium carbonate, and the filtrate contains sodium salts of chlorophyl and of other fatty acids. This solution is concentrated if too dilute, saturated with sodium chloride and brought to a pH of about 8–9 with acetic acid and the precipitate of sodium chlorophyllin is filtered off. This precipitate may be further purified.

The pigment solution from step 2—namely II.—is next treated with a water-soluble inorganic sulfate, such as sodium sulfate or magnesium sulfate, preferably magnesium sulfate, in an amount sufficient to cause the removal of any barium compounds from the solution as barium sulfate. The sulfate may be added as a solution or solid. This mixture is then concentrated to a very small volume—in the neighborhood of 30% acetone and 70% water solution. This mixture is cooled and the carotene is contained in the deep red or brown waxy precipitate which has formed. This precipitate is product III. and is designated as the crude unsaponifiable concentrate. From good alfalfa leaf meals this concentrate contains about 2% carotene, and in yields of approximately 90% of the total carotene extracted.

The following is an illustrative example of the process as thus far described:

20 lbs. of dehydrated alfalfa leaf meal is extracted with 25 gallons of acetone, and this is concentrated down to 3.2 gallons, with the following analysis. Carotene 1586 mg., xanthophyll 1952 mg., and chlorophyl 41.48 gm.

415 gm. of $Ba(OH)_2.8H_2O$ dissolved in 1800 cc. of hot water (58° C.) is added to the above solution with agitation. Then 160 gm. of Hyflo Supercel is added, and the mixture refluxed for 1 hour and then cooled to 28° C. The green barium sludge is filtered off on a Buchner funnel with suction. The washings from the barium sludge are combined with the filtrate, making a total volume of 4.6 gallons and containing 1470 mg. carotene and 1566 mg. xanthophyll. At this point sufficient water-soluble sulfate, preferably magnesium sulfate, is added to remove any soluble barium that may be present. The solution is then concentrated down to 0.72 gallon so that the acetone concentration is about 30%. The mixture is then cooled to 17° C. and the crude carotene concentrate (III) filtered off, amounting to 75 gm.

The purification of the crude unsaponifiable concentrate III may be accomplished by several different procedures depending upon the final product desired. The simplest procedure is to add vegetable oil directly to the crude unsaponifiable concentrate, warm slightly and then cool in a refrigerator to chill out any residue. The residue is then removed, either by filtering or centrifuging, leaving a deep-red unsaponifiable lipid-in-oil concentrate product suitable for human or animal use as a source of vitamin A. Most of the xanthophyll is left in this product IV.

Another procedure for purifying the crude carotene concentrate III and which results in a purer carotene solution is as follows. Hot petroleum naphtha (5) is added to the crude carotene concentrate and the mixture is cooled (5a). Crude xanthophyll remains as a residue which can be filtered off and either used as such or further purified. The naphtha solution of carotene (V) is concentrated (6) to remove the solvent, preferably under vacuum with a nitrogen atmosphere, and to the residual oil (VI) hot acetone (7) is added. A dark waxy residue remains which is filtered off, and on cooling the acetone solution in a refrigerator a light colored waxy material comes out. This is filtered off and the solvent removed under vacuum with a nitrogen atmosphere. A highly purified unsaponifiable constituent VIII is obtained. Crystalline carotene may be obtained from this material by the use of suitable solvents, or the concentrate may be taken up directly into a vegetable oil and used as a purified carotene-in-oil concentrate.

A better method for obtaining a purified unsaponifiable lipid-in-oil concentrate similar to the above consists in dissolving the crude carotene concentrate III in hot petroleum naphtha (5), cooling (5a) and removing the crude xanthophyll, and then removing the petroleum solvent under vacuum. To this residue is added hot vegetable oil (4) with stirring, and upon cooling (4a) in a refrigerator a waxy residue is thrown down leaving a clear deep-red carotene-in-oil concentrate similar to IV but containing much less xanthophyll.

From the process as hereinabove described, it will be apparent that there may be obtained carotene associated with plant sterols and other unsaponifiable constituents; xanthophyll, a yellow pigment which may have value as a vegetable pigment for food coloring; derivatives of chlorophyl which may be extensively used as therapeutic agents; and certain waxy and water-soluble constituents of plants. In addition to the isolation and purification of these products, the extracted dehydrated green plant tissue which remains contains fibrous (cellulosic) material, carbohydrates, and proteins in substantially unchanged condition.

Another important feature of the invention is that the unsaponifiable constituent obtained may be irradiated with an ultra-violet light thereby converting some at least of the sterols present into substances having vitamin D activity. Moreover, in carrying out the irradiation there is no appreciable loss in the carotene content. Thus a product is obtained having value both for its vitamin A and vitamin D activity which may be used directly for foods or may be used to fortfy other products containing vitamin activity.

In the preceding description of the process, the preferred starting material has been indicated as dehydrated alfalfa leaf meal, but the invention is also applicable to the extraction of valuable products from other green plant tissue. Moreover, the invention in its broader aspects is useful in obtaining the unsaponifiable constituents from any source in nature whether containing chlorophyl or not.

In the initial extraction of the plant tissue, the preferred reagent is acetone, but in lieu thereof other organic solvents may be used such as ethyl methyl ketone, diacetone alcohol, ethyl alcohol, methyl alcohol, propyl alcohol, etc., and in general any water miscible lower molecular weight ketone or alcohol.

The filter aid used in the barium hydroxide treatment is preferably diatomaceous earth or other product which is commercially available for facilitating filtering and washing of the filter cake.

In place of petroleum naphtha for the separation of xanthophyll from the crude concentrate of unsaponifiable constitutents, there may be used petroleum ether, hexane or other hydrocarbon in which xanthophyll is not soluble to any appreciable extent.

In carrying out the barium hydroxide treatment, while we have found that the optimum conditions require a ratio of 85% acetone to 15% water, it is obvious that the invention is operable with certain variations in ratio, and in general the limits for the water content are from 10% to 20%.

In the foregoing examples it is to be understood that the percentages referred to in the ratio of water to the acetone or other reagents or solvents are volume percentages.

What we claim as our invention is:

1. Process for obtaining a product containing unsaponifiable constituents which comprises extracting plant tissue of low lipoid content with a water-miscible lower molecular weight organic solvent of the class consisting of ketones and alcohols, reacting said extract with barium hydroxide while maintaining the ratio of organic solvent to water on the order of 90% to 80% of solvent to 10% to 20% of water thereby effecting a precipitation of saponifiable constituents, separating the solution from the precipitate and increasing the water ratio in said solution to thereafter precipitate the unsaponifiable constituents.

2. Process according to claim 1, in which the organic solvent is acetone.

3. Process for obtaining a product containing unsaponifiable constituents which comprises extracting green plant tissue of low lipoid content with a water-miscible lower molecular weight organic solvent of the class consisting of ketones and alcohols, reacting said extract with barium hydroxide while maintaining the ratio of solvent to water on the order of 85 to 15 thereby effecting a precipitation of saponifiable constituents, separating the solution from the precipitate, adding soluble sulfate to react with soluble barium compound, and concentrating until the unsaponifiable constituents are precipitated.

4. Process for obtaining unsaponifiable constituents, which comprises extracting a green plant material of low lipoid content with a water-miscible lower molecular weight organic solvent of the class consisting of ketones and alcohols, reacting said extract with barium hydroxide while maintaining the ratio of organic solvent to water on the order of 85 to 15 thereby effecting a precipitation of saponifiable constituents, separating the solution from the precipitate, increasing the water ratio in said solution to thereby precipitate the unsaponifiable constituents, dissolving the precipitate in a hot petroleum solvent, and cooling the solution to thereby separate out xanthophyll leaving a solution of purified unsaponifiable constituents.

5. Process for obtaining a carotene concentrate from green plant tissue, which comprises extracting dehydrated plant tissue with acetone, reacting said extract with a saturated solution of barium hydroxide in such amount that the ratio of acetone to water in the combined mixture is on the order of 85 to 15, refluxing until the saponifiable constituents in the acetone solution are precipitated as barium salts, separating the precipitate, concentrating the filtrate until the water content is increased to precipitate unsaponifiable constituents, extracting said unsaponifiable constituents in hot petroleum solvent, cooling the solution to precipitate xanthophyll, and concentrating the remaining solution to obtain a purified concentrate of unsaponifiable constituents.

6. Process for obtaining extractives from green plant tissue which comprises extracting said tissue with a water-miscible lower molecular weight organic solvent of the class consisting of ketones and alcohols, concentrating the solution thus obtained, reacting said extract with barium hydroxide octahydrate and a filter aid while maintaining the ratio of organic solvent to water in the order of 85 to 15, thereby effecting a precipitation of saponifiable constituents, separating the solution from the precipitate, adding soluble sulfate to precipitate excess barium from said solution, concentrating said solution until the organic solvent content is on the order of 30%, cooling the solution, thereby precipitating a non-saponifiable fraction containing carotene, and separating said fraction from the solution.

7. Process for obtaining crystalline carotene from green plant tissue comprising extracting green plant tissue with a water-miscible lower molecular weight organic solvent of the class consisting of ketones and alcohols, removing chlorophyll and other saponifiable constituents by reacting said extract with barium hydroxide octahydrate while maintaining the ratio of organic solvent to water on the order of 85 to 15, removing excess barium from said solution with a soluble sulfate, concentrating said solution until the organic solvent concentration is on the order of 30%, cooling the solution to precipitate non-saponifiable constituents including carotene, extracting said non-saponifiable constituents with a hot petroleum solvent, cooling to obtain a solution of non-saponifiable constituents substantially free from xanthophyll, removing the petroleum solvent leaving an oily concentrate, extracting said oily concentrate with hot water-miscible organic solvent, cooling, filtering and concentrating said solution, dissolving in an organic solvent, and crystallizing carotene therefrom.

8. The method of removing chlorophyll from an extract of plant pigments including chlorophyll and carotene to permit the recovery of the carotene, which comprises preparing a mixture including said extrace of carotene and chlorophyll, a water-miscible lower molecular weight organic solvent of the class consisting of ketones and alcohols, barium hydroxide and water, thereafter permitting the chlorophyll to react with the barium hydroxide to produce a sludge insoluble in the liquids in the mixture, and subsequently separating the liquids and carotene contained therein from the sludge.

9. The method of extracting carotene from green plant material containing chlorophyll and carotene which comprises extracting the plant pigments from the plant material with a water-miscible lower molecular weight organic solvent of the class consisting of ketones and alcohols, barium hydroxide and water while maintaining the ratio of organic solvent to water on the order of 85 to 15, permitting the barium hydroxide and chlorophyll in said mixture to react to produce a sludge insoluble in the liquids in the mixture, thereafter separating the liquids and carotene contained therein from the sludge, and finally recovering the carotene from said liquids.

10. The method of extracting carotene from green plant material which comprises extracting the plant pigments including carotene and chlorophyll from the plant material with a water-miscible lower molecular weight organic solvent of the class consisting of ketones and alcohols, reacting said extract with finely divided barium hydroxide octahydrate and water while maintaining the ratio of organic solvent to water on the order of 85 to 15, subsequently heating the mixture to cause the reaction of the chlorophyll in the mixture with the barium hydroxide octahydrate to form a sludge containing the chlorophyll and a solution containing the carotene, thereafter separating the sludge and the solution, subsequently concentrating the solution, and finally recovering the carotene from the concentrate.

11. Process for obtaining a product containing unsaponifiable constituents which comprises extracting plant tissue of low lipoid content with a water-miscible lower molecular weight organic solvent of the class consisting of ketones and alcohols, reacting said extract with barium hydroxide while maintaining the ratio of organic solvent to water on the order of 90% to 80% of solvent to 10% to 20% of water thereby effecting a precipitation of saponifiable constituents.

HAROLD G. PETERING.
PAUL W. MORGAL.